(12) United States Patent
Chen

(10) Patent No.: US 7,812,566 B2
(45) Date of Patent: Oct. 12, 2010

(54) BATTERY CHARGING DEVICE

(75) Inventor: Chien-Hung Chen, Tu-Cheng (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 197 days.

(21) Appl. No.: 12/170,527

(22) Filed: Jul. 10, 2008

(65) Prior Publication Data

US 2009/0261780 A1   Oct. 22, 2009

(30) Foreign Application Priority Data

Apr. 18, 2008   (CN)   .................. 2008 1 0301201

(51) Int. Cl.
*H02J 7/00* (2006.01)
(52) U.S. Cl. ..................................... 320/110
(58) Field of Classification Search .................. 320/110, 320/113
See application file for complete search history.

(56) References Cited

U.S. PATENT DOCUMENTS

| | | | | |
|---|---|---|---|---|
| 5,057,761 A * | 10/1991 | Felegyhazi, Sr. | ............ | 320/110 |
| 5,287,052 A * | 2/1994 | Wang | .......................... | 320/110 |
| 5,686,808 A * | 11/1997 | Lutz | ............................ | 320/110 |
| 5,758,108 A * | 5/1998 | Nakamura | ................... | 710/307 |
| 5,886,581 A * | 3/1999 | Hugel et al. | ................ | 330/308 |
| 5,933,010 A * | 8/1999 | Moreno | ....................... | 324/425 |
| 6,018,227 A * | 1/2000 | Kumar et al. | ............... | 320/106 |
| 6,160,376 A * | 12/2000 | Kumar et al. | ............... | 320/116 |
| 6,331,761 B1 * | 12/2001 | Kumar et al. | ............... | 320/132 |
| 6,384,575 B1 * | 5/2002 | Chen et al. | .................. | 320/110 |
| 7,446,502 B2 * | 11/2008 | Tong | .......................... | 320/110 |
| 2006/0255763 A1 * | 11/2006 | Lung Tong | .................. | 320/110 |

OTHER PUBLICATIONS

National Semiconductor, Low power low offset voltage dual comparators, Aug. 2002.*

* cited by examiner

*Primary Examiner*—Edward Tso
*Assistant Examiner*—Ramy Ramadan
(74) *Attorney, Agent, or Firm*—Steven M. Reiss

(57) ABSTRACT

A battery charging device (100) includes an adapter (10), at least one regulating circuit (30) and an attaching mechanism (40). The adapter is configured for connecting power supplies. The regulating circuit is electronically connected to the adapter, and regulates charging electric potential and charging current. The attaching mechanism is electronically connected to the regulating circuit, fixes different types of batteries thereon and electronically connects charged batteries to the battery charging device to charge.

16 Claims, 3 Drawing Sheets

BATTERY CHARGING DEVICE

BACKGROUND

1. Field of the Invention

The present invention relates to battery charging devices, particularly to a battery charging device employed in testing process of batteries.

2. Description of Related Art

Batteries are widely used in portable electronic devices, such as mobile phones. Different batteries used in different portable electronic devices need different charging devices. When charging a battery, the battery connects to a power supply by its corresponding charging device to be charged, thus the battery can be repeatedly used.

An individual user usually has a number of different batteries used for a number of different portable electronic devices and corresponding to a number of different charging devices for these batteries. It may be difficult and expensive to manufacture, prepare, purchase, and keep track of a great number of charging devices.

Therefore, a new battery charging device is desired in order to overcome the above-described shortcomings.

BRIEF DESCRIPTION OF THE DRAWINGS

Many aspects of the present battery charging device can be better understood with reference to the following drawings. The components in the various drawings are not necessarily drawn to scale, the emphasis instead being placed upon clearly illustrating the principles of the present battery charging device. Moreover, in the drawings, like reference numerals designate corresponding parts throughout the diagrams, in which.

DETAILED DESCRIPTION OF THE EXEMPLARY EMBODIMENT

Figure 1:
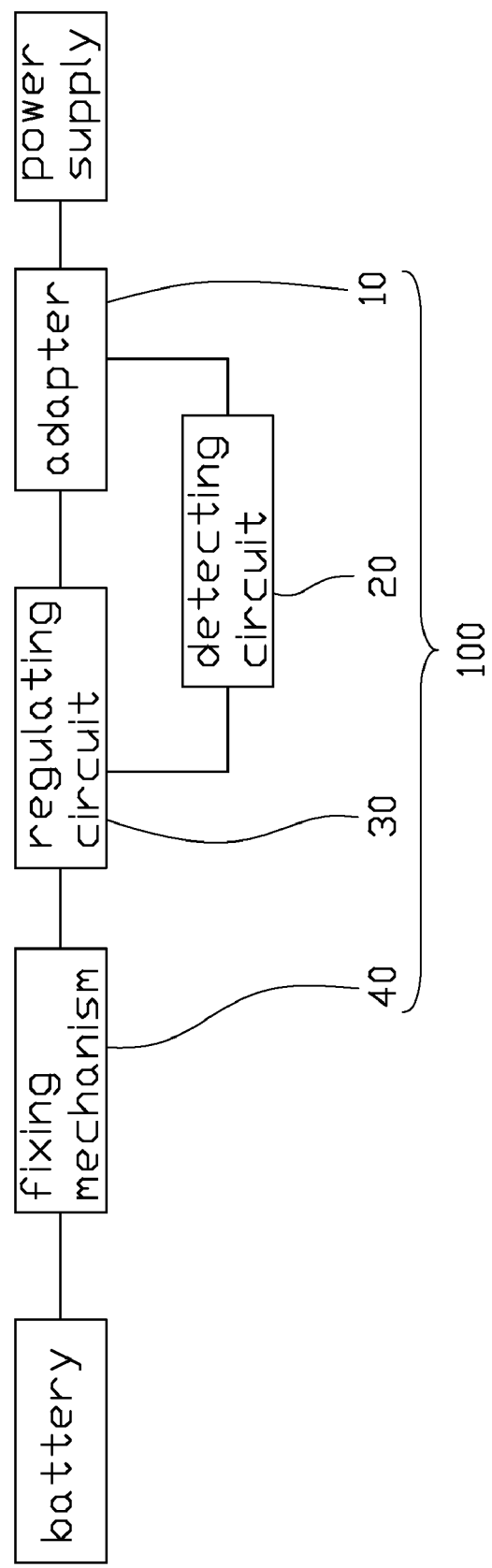
FIG. 1 is a diagram of a battery charging device according to an exemplary embodiment.

Referring to FIG. 1, a battery charging device 100 according to an exemplary embodiment is shown. The battery charging device 100 includes an adapter 10 for connecting to a power supply (not shown), at least one detecting circuit 20, at least one regulating circuit 30 electronically connected to the detecting circuit 20, and an attaching mechanism 40 configured for attaching batteries thereto. Both the detecting circuit 20 and the regulating circuit 30 are electronically connected to the adapter 10, and the attaching mechanism 40 is electronically connected to the regulating circuit 30. In use, a battery is fixed in the attaching mechanism 40 and electronically connected to the attaching mechanism 40. A power supply is electronically connected to the adapter 10. The battery can be charged by the adapter 10, the regulating circuit 30 and the attaching mechanism 40. The detecting circuit 20 detects the charging process and shows charging states of the battery.

The adapter 10 can be a conventional wall plug. The battery charging device 100 can be directly connected to a conventional power supply, such as a wall receptacle, by the adapter 10, and then receives electric energy provided by the power supply.

Figure 2:
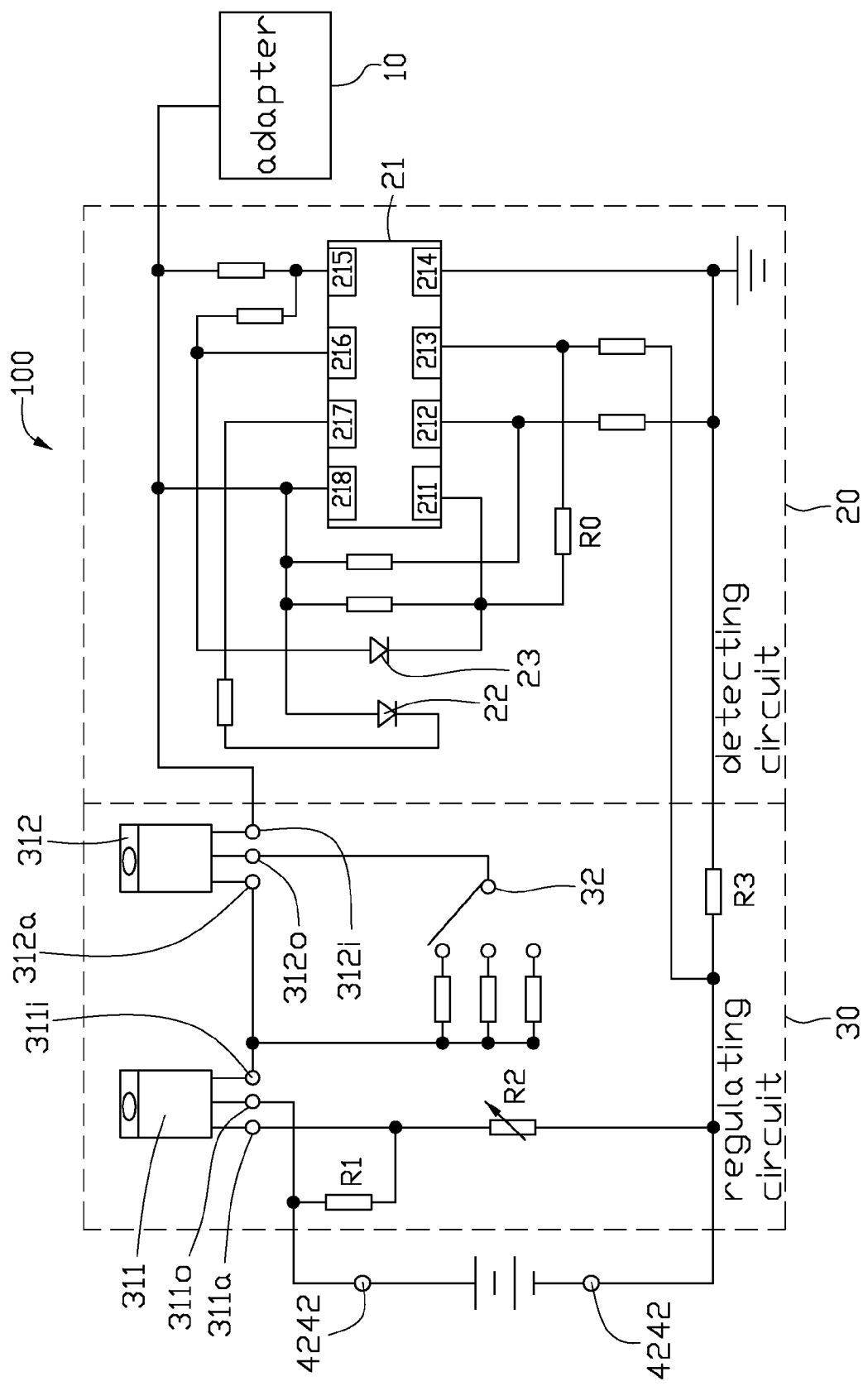
FIG. 2 is a circuit diagram of the battery charging device shown in FIG. 1.

Also referring to FIG. 2, the detecting circuit 20 includes a voltage comparator 21, a first light emitting diode (LED) 22, a second LED 23 and a plurality of resistors (not labeled). The voltage comparator 21 is an LM393 chip, which includes a first outputting connector 211, a first negative inputting connector 212, a first positive inputting connector 213, a grounding connector 214, a second positive inputting connector 215, a second negative inputting connector 216, a second outputting connector 217 and a power supply connector 218. According to characteristics of the LM393 chip, the connector 211 outputs a high electric potential when an electric potential inputted into the connector 213 is higher than an electric potential inputted into the connector 212, and outputs a low electric potential when an electric potential inputted into the connector 213 is lower than an electric potential inputted into the connector 212. The connector 217 outputs a high electric potential when an electric potential inputted into the connector 215 is higher than an electric potential inputted into the connector 216, and outputs a low electric potential when an electric potential inputted into the connector 215 is lower than an electric potential inputted into the connector 216.

The first LED 22 can emit red light and the second LED 23 can emit green light, which is used to show different charging states of batteries charged by the battery charging device 100. However, the light emitted by the first LED 22 and the second LED 23 can be other colors. The connector 217 is electronically connected to a cathode of the first LED 22 by a predetermined protective resistor (not labeled). The connector 211 is electronically connected to a cathode of the second LED 23 directly, and also electronically connected to the connector 213 by a feedback resistor R0 to form a feedback.

The regulating circuit 30 includes a first regulator 311, a second regulator 312, a switch 32, a first regulating resistor R1, a second regulating resistor R2 and a grounding resistor R3. Both the first regulator 311 and the second regulator 312 are LM317 chips. The first regulator 311 includes a first inputting connector 311i, a first outputting connector 311o and a first regulating connector 311a. The second regulator 312 includes a second inputting connector 312i, a second outputting connector 312o and a second regulating connector 312a. The second regulating connector 312a is electronically connected to the first inputting connector 311i.

The switch 32 is a multiplex switch, including a plurality of channels (not labeled) configured for being selectively switched to. Each channel has a different resistance. The second outputting connector 312o is electronically connected to the first inputting connector 311i by the switch 32, thus an outputting current of the regulating circuit 30 can be regulated by switch 32.

The first outputting connector 311o is electronically connected to the first regulating connector 311a by the first regulating resistor R1. The second regulating resistor R2 is a rheostat. One end of the second regulating resistor R2 is electronically connected to the first regulating connector 311a directly, and also electronically connected to the first outputting connector 311o by the first regulating resistor R1; the other end of the second regulating resistor R2 is electronically connected to the grounding resistor R3. The grounding resistor R3 has one end electronically connected to the second regulating resistor R2 and another end grounded.

Figure 3:
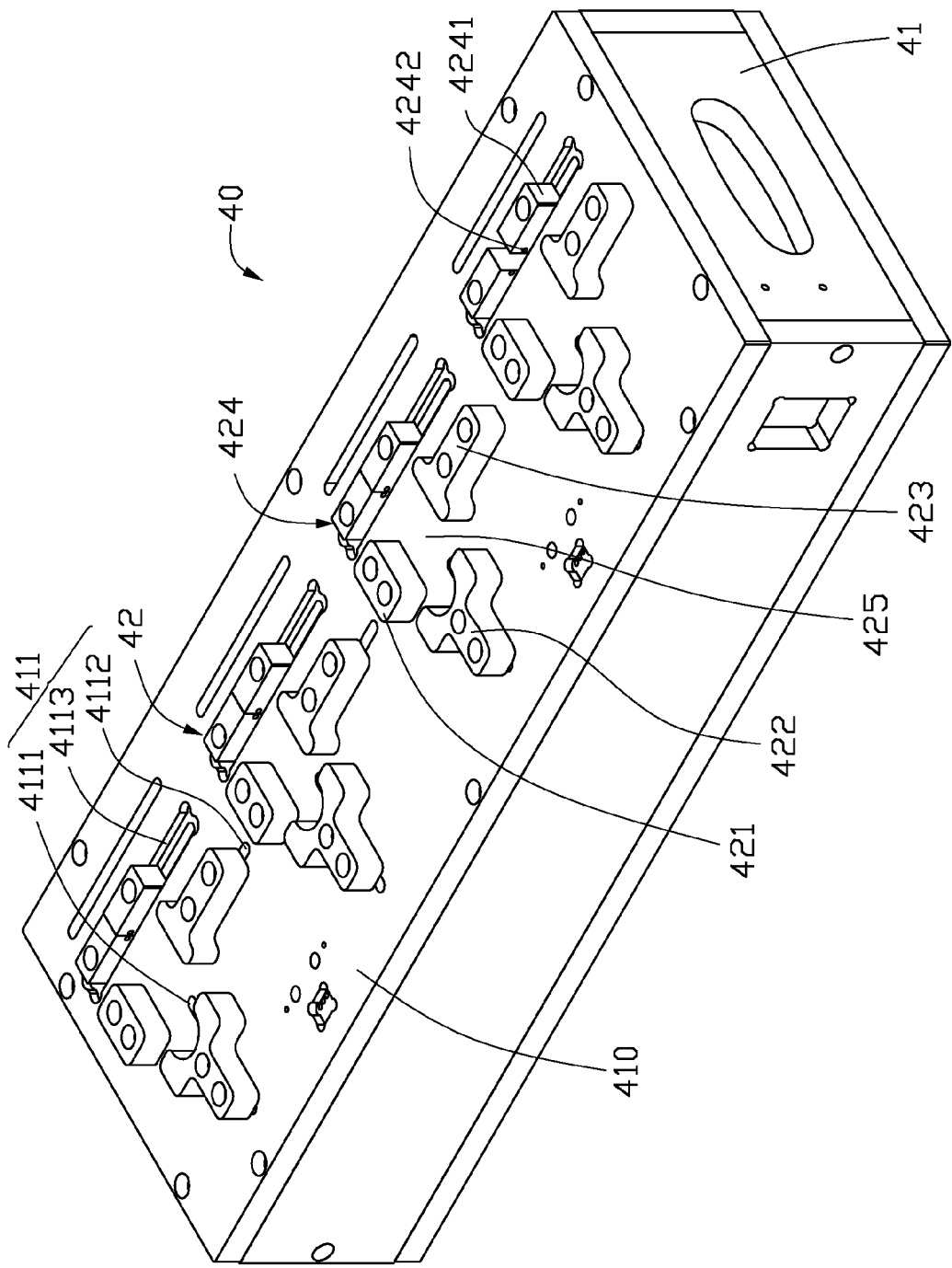
FIG. 3 is a schematic view of the attaching member of the battery charging device shown in FIG. 1 and FIG. 2.

Also referring to FIG. 3, the attaching mechanism 40 includes a housing 41 and at least one attaching member 42 mounted on the housing 41. The housing 41 is a rectangular box including a top board 410, which defines a plurality of receiving members 411 therein. Each receiving member 411 includes a first groove 4111, a second groove 4112 perpendicular to the first groove 4111 and a third groove 4113 parallel to the second groove 4112. The second groove 4112 is defined between the first groove 4111 and the third groove 4113.

Each attaching member 42 includes a first attaching component 421, a second attaching component 422, a third attaching component 423 and a connecting component 424. The first attaching component 421, the second attaching component 422 and the third attaching component 423 are all blocks made of insulated material. The first attaching component 421 is fixed on the top board 410 and positioned between the first groove 4111 and the second groove 4113. The second attaching component 422 is slidably engaged in the first groove 4111, and the third attaching component 423 is slidably engaged in the second groove 4112. Both the first attaching component 422 and the third attaching component 423 can be fixed in predetermined positions by conventional means, such as bolts, and then cooperate with the first attaching component 422 to form an approximately U-shaped attaching gap 425, which has an opening (not labeled) positioned towards the third groove 413.

The connecting component 424 includes a pair of sliding blocks 4241 made of insulated materials and a pair of connectors 4242 respectively corresponding to anodes and cathodes of charged batteries and respectively mounted on the sliding blocks 4241. The sliding blocks 4241 are slidably engaged in the third groove 4113, and the connectors 4242 mounted thereon arc positioned towards the attaching gap 425.

In assembly, the second inputting connector 312i of the regulating circuit 30 is electronically connected to the adapter 10. The adapter 10, the detecting circuit 20 and the regulating circuit 30 are all received in the housing 41 of the attaching mechanism 40. The regulating circuit 30 is electronically connected to the pair of connectors 4242, wherein one connector 4242 corresponding to anodes of charged batteries is electronically connected to a linkage between the first regulating resistor R1 and the first outputting connector 311o, and another connector 4242 corresponding to cathodes of charged batteries is electronically connected to a linkage between the second regulating resistor R2 and the grounding resistor R3.

The detecting circuit 20 and the regulating circuit 30 are electronically connected to the adapter 10 in parallel, thus the detecting circuit 20 can detect charging process and show charging states of charged batteries. In the voltage comparator 21, the connector 218 is directly connected to the adapter 10, and the connectors 212, 213, 215 and 216 are all connected to the adapter 10 by predetermined resistors (not labeled). Thus, the voltage comparator 21 receives working electric potential. The connector 214 is connected to the ground. The connector 212 is connected to a linkage between the ground and the grounding resistor R3 by predetermined resistor (not labeled). The connector 213 is connected to a linkage between the second regulating resistor R2 and the grounding resistor R3 by predetermined resistor (not labeled). The anodes of the first LED 22 and the second LED 23 are both connected to the adapter 10. The anode of the first LED 22 is also connected to the connectors 212 and 213 by predetermined resistor (not labeled), and the anode of the second LED 23 is connected to the connector 216.

In use, the adapter 10 is electronically connected to a conventional power supply (not shown). Positions of the second attaching component 422 and the third attaching component 423 are adjusted until the attaching gap 425 is adapted to fit a charged battery (not shown). Understandably, the attaching member 42 is adjustable so as to allow different types of batteries having different sizes and shapes to be fixed therein.

The battery is then received in the attaching gap 425, and connectors of the battery are positioned towards an opening of the attaching gap 425. The second attaching component 422, the third attaching mechanism 423 and connecting components 424 are then slid along their corresponding grooves, so that the connectors 4242 are moved to be in contact with connectors of the battery. In this way, the power supply is electronically connected to the battery by the adapter 10, the regulating circuit 30 and the connectors 4242, thus providing an electric energy to charge the battery by the battery charging device 100. In the charging process, the first regulating resistor R1 and the second regulating R2 regulates the charging electric potential and current, and the grounding resistor R3 prevents the charged battery from being directly connected to the ground.

According to the characteristics of LM317 chips, in a predetermined range of an inputted electric potential into the first inputting connector 311i, the electric potential Vo outputted from the first outputting connector 311o is independent of the inputted electric potential of the first inputting connector 311i, and only corresponds to resistances of the first regulating resistor R1 and the second regulating resistor R2. A formula for calculating the outputted potential Vo is Vo=1.25(1+R2/R1). Therefore, the charging voltage can be regulated by adjusting a resistance of the second regulating resistor R2 in a charging process. At the same time, a charging current can be regulated by using switch 32 to selectively switch between channels having different resistances.

In a charging process, the detecting circuit 30 can show a charging state of the battery by means of selectively turning on the first LED 22 of the second LED 23. When a battery is firstly received in the attaching mechanism 40 to be charged, it has a low electric potential while the first regulating resistor R1 and the second resistor R2 have a high electric potential. In this way, the connector 213 of the voltage comparator 21 gets a high electric potential, while the connector 212 is grounded by a protective resistor and gets a low electric potential. Thus, the connector 211 outputs a high electric potential to a cathode of the second LED 23, and the second LED 23 is turned off. At the same time, the connectors 215 and 216 receive a same electric potential outputted by the adapter 10, thus the connector 217 outputs a low electric potential to a cathode of the first LED 22. In this way, the first LED is turned on and emits light to indicate that the battery is being charged.

When the battery is charged and receives a same electric potential as that of the regulating circuit 30, an electric potential of the connector 213 falls to be same as that of the connector 212. In this way, the connector 211 outputs a low electric potential to a cathode of the second LED 23, thus the second LED 23 is turned on and emits light to indicate that the battery is fully charged. The low electric potential outputted to the second LED 23 influences the connector 216 so that an electric potential of the connector 216 is lower than that of the connector 215. Thus, the connector 217 outputs a high electric potential to a cathode of the first LED 22, and the first LED 22 is then turned off. Furthermore, the feedback formed between the connectors 211 and 213 prevents the first LED 22 and the second LED 23 emitting at a same time when a charging process of the battery is just completed.

Understandably, the battery charging device 100 can further comprise a plurality of detecting circuits 20 and regulating circuits 30 corresponding to the detecting circuits 20. Each regulating circuits 30 is electronically connected to a corresponding detecting circuit 20. All regulating circuits 30 and detecting circuits 20 are connected to a same adapter 10 and received in a same housing 41, and the pair of connectors 4242 of each attaching member 42 is connected to a regulating circuit 30. In this way, the battery charging device 100 can charge a plurality of batteries at a same time by one adapter 10 and one power supply.

Furthermore, in the attaching mechanism 40, the first attaching component 421 can also be slidably mounted on the top board 410 by conventional means such as sliding groove, and fixed in predetermined positions by conventional means such as bolting in use. The connectors 4242 can also be mounted on the first attaching component 421, the second attaching component 422 and the third attaching component 423. The voltage comparator 21, the first regulator 31 and the second regulator 32 can be replaced by other chips or circuits having same functions.

The present battery charging device 100 includes an attaching gap 425 having adjustable size and shape for receiving different types of batteries therein, and can regulate charging electric potential and current in charging process of the batteries. Thus, the battery charging device 100 can be used to charge a plurality of batteries of different types at a same time.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A battery charging device, comprising:
an adapter configured for connecting to a power supply:
at least one regulating circuit electronically connected to the adapter, and
configured for regulating charging electric potential and charging current: the regulating circuit including a first regulator, a second regulator, a first regulating resistor, and a second regulating resistor; each of the regulators including an inputting connector, an outputting connector and a regulating connector, the inputting connector of the second regulator electronically connected to the adapter, and the regulating connector of the second regulator electronically connected to the inputting connector of the first regulator~the outputting connector of the first regulator electronically connected to the regulating connector of the first regulator by the first regulating resistor; one end of the second regulating resistor electronically connected to the regulating connector of the first regulator, and also electronically connected to the outputting connector of the first regulator by the first regulating resistor; the other end of the second regulating resistor electronically connected to a grounding resistor; the first regulator, the second regulator, the first regulating resistor, and the second regulating resistor cooperatively regulating the charging electric potential; and
an attaching mechanism electronically connected to the regulating circuit, and configured for attaching different types of batteries to the charging device and electronically connecting batteries to the battery charging device to be charged.

2. The battery charging device as claimed in claim 1, wherein the attaching mechanism includes at least one adjustable attaching member configured for attaching different types of batteries, the attaching member including a pair of connectors movably mounted thereon, one connector corresponding to anodes and a second connector corresponding to cathodes of charged batteries and configured for electronically connecting charged batteries to the regulating circuit.

3. The battery charging device as claimed in claim 2, wherein the attaching member includes a plurality of attaching components, the attaching components defining an attaching gap for receiving the charged batteries therein, and a size and a shape of the attaching gap being adjustable.

4. The battery charging device as claimed in claim 3, wherein the attaching mechanism includes a housing receiving the adapter and the regulating circuit therein, the housing defining a plurality of grooves therein, and the attaching components being slidably mounted in the grooves.

5. The battery charging device as claimed in claim 4, wherein the attaching mechanism includes a connecting component slidably mounted in one groove of the housing, the connectors being mounted on the connecting component.

6. The battery charging device as claimed in claim 3, wherein both of the first regulator and the second regulator being LM317 chips.

7. The battery charging device as claimed in claim 6, wherein the regulating circuit includes a switch, the outputting connector of the second regulator being electronically connected to the inputting connector of the first regulator by the switch.

8. The battery charging device as claimed in claim 7, wherein the switch includes a plurality of channels having different resistances, and a charging current is regulated by means of selectively switching on the channels in a charging process.

9. The battery charging device as claimed in claim 6, wherein the grounding resistor has one end electronically connected to the second regulating resistor and another end grounded.

10. The battery charging device as claimed in claim 9, wherein the second regulating resistor is a rheostat, and the charging voltage being regulated by adjusting a resistance of the second regulating resistor in a charging process.

11. The battery charging device as claimed in claim 9, wherein one connector corresponding to anodes of charged batteries is electronically connected to a linkage between the first regulating resistor and the outputting connector of the first regulator, and another connector corresponding to cathodes of charged batteries is electronically connected to a linkage between the second regulating resistor and the grounding resistor.

12. The battery charging device as claimed in claim 1, further comprising a detecting circuit electronically connected to the adapter and the regulating circuit to detect the charging process and show charging states of charged batteries.

13. The battery charging device as claimed in claim 12, wherein the detecting circuit includes a voltage comparator, a first light emitting diode (LED) and a second LED; both of the first LED and the second LED being electronically connected to the voltage comparator; the voltage comparator being electronically connected to the adapter and the regulating circuit to detect charging process of charged batteries, and selectively turning on the first LED and the second LED according to charging states.

14. The battery charging device as claimed in claim 13, wherein the voltage comparator is an LM393 chip, which includes a first outputting connector, a first negative inputting connector, a first positive inputting connector, a grounding connector, a second positive inputting connector, a second negative inputting connector, a second outputting connector and a power supply connector; the first LED has an anode electronically connected to the adapter, the first negative inputting connector and the first positive inputting connector, and a cathode electronically connected to the second outputting connector; the second LED having an anode electronically connected to the second negative inputting connector and a cathode electronically connected to the first outputting connector.

15. The battery charging device as claimed in claim 14, wherein the first outputting connector is electronically connected to the first positive inputting connector to form a feedback.

16. The battery charging device as claimed in claim 1, wherein electric potential output by the outputting connector of the first regulator charges batteries attached to the attaching mechanism, and the electric potential output by the outputting connector of the first regulator determined by the resistances of the first regulating resistor and the second regulating resistor.

* * * * *